(12) United States Patent
Chen (10) Patent No.: US 10,109,035 B2
(45) Date of Patent: Oct. 23, 2018

(54) METHOD FOR DISPLAYING A PICTURE ON A TERMINAL, AND THE TERMINAL

(71) Applicant: HISENSE ELECTRIC CO., LTD., Qingdao (CN)

(72) Inventor: Chunxiao Chen, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/217,110

(22) Filed: Jul. 22, 2016

(65) Prior Publication Data

US 2017/0116706 A1 Apr. 27, 2017

(30) Foreign Application Priority Data

Oct. 22, 2015 (CN) .......................... 2015 1 0683047

(51) Int. Cl.
| | |
|---|---|
| *G09G 5/00* | (2006.01) |
| *G06T 3/40* | (2006.01) |
| *G06F 3/0484* | (2013.01) |
| *G06F 3/0488* | (2013.01) |
| *G06T 3/60* | (2006.01) |

(52) U.S. Cl.
CPC .............. *G06T 3/40* (2013.01); *G06F 3/0488* (2013.01); *G06F 3/04842* (2013.01); *G06F 3/04845* (2013.01); *G06T 3/60* (2013.01)

(58) Field of Classification Search
None
See application file for complete search history.

(56) References Cited

U.S. PATENT DOCUMENTS

| 5,111,192 | A | * | 5/1992 | Kadakia | ................. | G06T 3/602 |
| | | | | | | 345/530 |
| 8,234,591 | B1 | * | 7/2012 | Dhawan | .............. | G06F 3/04845 |
| | | | | | | 715/825 |
| 2006/0224997 | A1 | * | 10/2006 | Wong | ................ | G06F 17/30884 |
| | | | | | | 715/838 |
| 2009/0031247 | A1 | * | 1/2009 | Walter | .................. | G06F 9/4443 |
| | | | | | | 715/788 |
| 2009/0319897 | A1 | * | 12/2009 | Kotler | ................ | G06F 3/04845 |
| | | | | | | 715/711 |

(Continued)

*Primary Examiner* — Kyle Zhai
(74) *Attorney, Agent, or Firm* — Harness, Dickey & Pierce, P.L.C.

(57) ABSTRACT

The disclosure provides a method for displaying a picture on a terminal, and the terminal, wherein the method includes: receiving a picture display instruction; entering a rotation preview mode in which the original picture to which the picture display instruction points is rotated at different angles into rotation preview pictures, and the rotation preview pictures are displayed in each sub-area of an interface of the terminal respectively, wherein the sub-areas are at least two sub-areas into which a picture display area of the terminal is divided; receiving a selection instruction of a user; and exiting the rotation preview mode, and entering a picture display mode in which a rotation preview picture in a target sub-area to which the selection instruction points is displayed in the picture display area, and the rotation preview pictures in the other sub-areas are stopped from being displayed.

10 Claims, 4 Drawing Sheets

(56) References Cited

U.S. PATENT DOCUMENTS

| | | | | |
|---|---|---|---|---|
| 2010/0020238 A1* | 1/2010 | Kim | ................ | H04N 5/208 |
| | | | | 348/564 |
| 2012/0315954 A1* | 12/2012 | Ahn | ................ | G06F 1/1694 |
| | | | | 455/556.1 |
| 2013/0038627 A1* | 2/2013 | Mujkic | ................ | G06F 9/4443 |
| | | | | 345/619 |
| 2014/0146330 A1* | 5/2014 | Miyata | ................ | G06F 3/1205 |
| | | | | 358/1.9 |
| 2016/0092080 A1* | 3/2016 | Swanson | ................ | G06F 3/04845 |
| | | | | 345/654 |

* cited by examiner

Fig. 8

METHOD FOR DISPLAYING A PICTURE ON A TERMINAL, AND THE TERMINAL

CROSS-REFERENCE TO RELATED APPLICATION

This application claims the benefit and priority of Chinese Patent Application No. 201510683047.7 filed Oct. 22, 2015. The entire disclosure of the above application is incorporated herein by reference.

FIELD

The present disclosure relates to the field of displaying a picture and particularly to a method for displaying a picture on a terminal, and the terminal.

BACKGROUND

This section provides background information related to the present disclosure which is not necessarily prior art.

Handsets, computers, TV sets, and other various terminals have made our life colorful, and as functions of these terminals become increasingly powerful, more and more users come to browse web pages, to watch videos, view photos, etc., on these terminals.

SUMMARY

This section provides a general summary of the disclosure, and is not a comprehensive disclosure of its full scope or all of its features.

Some embodiments of the disclosure provide a terminal including a display screen with a display area including at least two sub-areas, the terminal including a memory, and one or more processors, wherein the memory is configured to store computer readable program codes, and the processor is configured to execute the computer readable program codes to perform:

obtaining an original picture;

adjusting the original picture to obtain at least a preview picture so that the preview picture is displayed in each sub-area respectively, wherein there are different preview display parameters of the each preview picture, and the number of sub-areas preview pictures is no less than the number of preview pictures;

determining a preview picture with the preview display parameter satisfying a predetermined condition; and adjusting the preview picture determined according to the size of the display area so that the preview picture determined is displayed in the display area.

some embodiments of the disclosure provide a method for displaying a picture on a terminal, the method including:

obtaining an original picture;

adjusting the original picture to obtain at least a preview picture so that the preview picture is displayed in each sub-area respectively, wherein preview display parameters of each preview picture are different, and the number of sub-areas preview pictures is no less than the number of preview pictures;

determining a preview picture with the preview display parameter satisfying a predetermined condition; and adjusting the preview picture determined according to the size of the display area so that the preview picture determined is displayed in the display area.

some embodiments of the disclosure provide a method for displaying a picture on a terminal, the method including:

receiving a picture display instruction;

entering a rotation preview mode in which the original picture to which the picture display instruction points is rotated at different angles into rotation preview pictures, and the rotation preview pictures are displayed in each sub-areas of an interface of the terminal respectively, wherein the sub-areas are at least two sub-areas into which a picture display area of the terminal is divided in advance;

receiving a selection instruction of a user; and exiting the rotation preview mode, and entering a picture display mode in which a rotation preview picture in a target sub-area to which the selection instruction points is displayed in the picture display area, and the rotation preview pictures in the other sub-areas are stopped from being displayed.

some embodiments of the disclosure further provide a terminal for displaying a picture, the terminal including:

an instruction receiving module configured to receive a picture display instruction;

an area dividing module configured to divide in advance a picture display area of the terminal into at least two sub-areas;

a rotating and displaying module configured to enter a rotation preview mode in which the original picture to which the picture display instruction points is rotated at different angles into rotation preview pictures, and the rotation preview pictures are displayed in each sub-areas of an interface of the terminal respectively;

the instruction receiving module further configured to receive a selection instruction of a user; and a picture displaying module configured to exit the rotation preview mode, and to enter a picture display mode in which a rotation preview picture in a target sub-area to which the selection instruction points is displayed in the picture display area, and the rotation preview pictures in the other sub-areas are stopped from being displayed.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
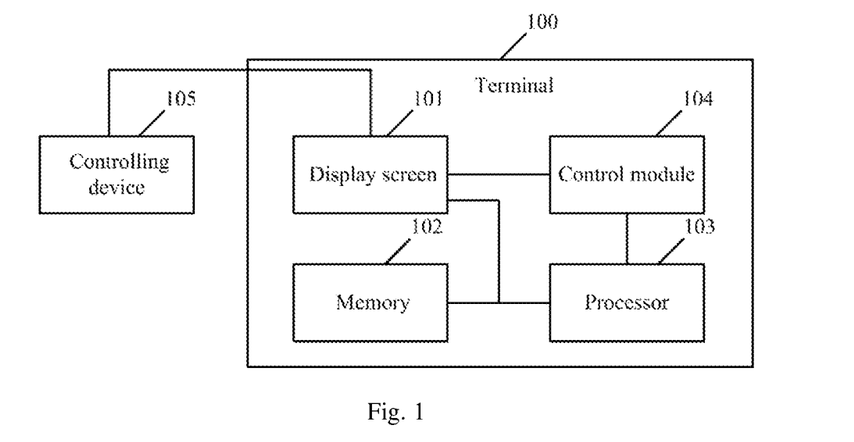
FIG. 1 is a structural block diagram of a terminal according to some embodiments of the disclosure.

Some embodiments of the disclosure provide a terminal, and as illustrated in FIG. 1, the terminal 100 includes a display screen 101 with a display area including at least two sub-areas; and the terminal includes a memory 102, and one or more processors 103, where the memory is configured to store computer readable program codes, and the processor is configured to execute the computer readable program codes to perform:

Obtaining an original picture;

Adjusting the original picture to obtain at least a preview picture so that the preview picture is displayed in the each sub-areas, where preview display parameters of each preview picture are different, and the number of sub-areas is no less than the number of preview pictures;

Determining a preview picture with the preview display parameter satisfying a predetermined condition; and Adjusting the preview picture determined according to the size of the display area so that the preview picture determined is displayed in the display area.

When the preview picture determined is displayed in the display area, the preview picture determined covers at least one of the sub-areas, or the preview picture determined is tiled throughout the display area.

The display area of the display screen is an area in which a text, a picture, a video, and/or other information is typically displayed; and in some embodiments, the display area is the display screen, or in some embodiments, the display is a part of the display screen.

The display area includes two or more than two sub-areas, and in some embodiments, the number of sub-areas can be an even number, e.g., four, six, etc.

In some embodiments, the original picture is reduced in size into a preview picture, and further the preview picture is processed, e.g., rotated, or adjusted using another parameter, into another preview picture. Each preview picture is a thumbnail or a reduced picture of the original picture, and the size of the preview picture is smaller than the size of the original picture.

A control module 104 can be built in the terminal 100 and configured to determine the preview picture with the preview display parameter satisfying the predetermined condition, or a control device 105 can be connected externally to the terminal 100 and configured to determine the preview picture with the preview display parameter satisfying the predetermined condition. The control device can be a remote controller, a handset, a tablet computer, etc., and in some cases, the control device can determine the preview picture with the preview display parameter satisfying the predetermined condition, by interacting with the terminal in a multi-screen mode.

In some embodiments, the preview display parameter is a rotation angle which can include 45, 90, 135, 180, 225, and/or 270 degrees, where the rotation angle refers to a rotation angle relative to the original picture, e.g., an angle of rightward rotation relative to the original picture, or an angle of leftward rotation relative to the original picture. In some embodiments, the predetermined condition refers to that the current angle of the preview picture determined matches with the display screen so that the preview picture and/or the original picture can be viewed conveniently. It shall be noted that if the preview display parameter is a rotation angle, then the preview picture is a rotation preview picture.

In some embodiments, the preview display parameter is a picture brightness, a picture definition, a rotation angle, and/or a contrast. The original picture is reduced in size into a preview picture, and further the parameter including the brightness, the definition, the rotation angle, and/or the contrast of the picture is adjusted to obtain a number of preview pictures. The predetermined condition refers to that the picture brightness, the picture definition, and/or the contrast matches with the current ambient illumination condition, so that a user can view comfortably the preview picture with the preview display parameter satisfying the predetermined condition under the current ambient illumination condition.

In some embodiments, before the original picture is obtained, the terminal can further firstly determine that attribute information carried in the original picture does not include a preview display parameter of the original picture being last displayed.

The terminal 100 can be a handset, a computer, a TV set, or another electronic device with a display screen and capable of displaying.

Figure 2:
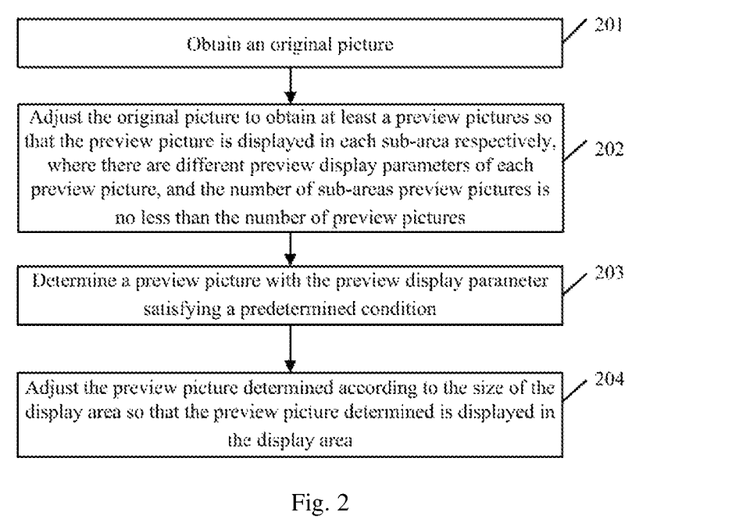
FIG. 2 is a flow chart of a method for displaying a picture on a terminal according to some embodiments of the disclosure.

Referring to FIG. 2 illustrating a flow chart of a method for displaying a picture on a terminal according to some embodiments of the disclosure, the method can include the following operations:

The operation 201 is to obtain an original picture;

The operation 202 is to adjust the original picture to obtain at least a preview picture so that the preview picture is displayed in each sub-areas respectively, where there are different preview display parameters of each preview picture, and the number of sub-areas preview pictures is no less than the number of preview pictures.

The operation 203 is to determine a preview picture with the preview display parameter satisfying a predetermined condition.

The operation 204 is to adjust the preview picture determined according to the size of the display area so that the preview picture determined is displayed in the display area.

Here the terminal can be a handset, a computer, a TV set, or another electronic device with a display screen and capable of displaying.

When the preview picture determined is displayed in the display area, the preview picture determined covers at least one of the sub-areas, or the preview picture determined is tiled throughout the display area.

The display area of the display screen is an area in which a text, a picture, a video, and/or other information is typically displayed; and in some embodiments, the display area is the display screen, or in some embodiments, the display are is a part of the display screen.

The display area includes two or more than two sub-areas, and in some embodiments, the number of sub-areas can be an even number, e.g., four, six, etc.

In some embodiments, the original picture is reduced in size into a preview picture, and further the preview picture is processed, e.g., rotated, or adjusted using another parameter, into another preview picture. Each preview picture is a thumbnail or a reduced picture of the original picture, and the size of the preview picture is smaller than the size of the original picture.

A control module can be built in the terminal and configured to determine the preview picture with the preview display parameter satisfying the predetermined condition, or a control device can be connected externally to the terminal and configured to determine the preview picture with the preview display parameter satisfying the predetermined condition. The control device can be a remote controller, a handset, a tablet computer, etc., and in some cases, the control device can determine the preview picture with the preview display parameter satisfying the predetermined condition, by interacting with the terminal in a multi-screen mode.

In some embodiments, the preview display parameter is a rotation angle which can include 45, 90, 135, 180, 225, and/or 270 degrees, where the rotation angle refers to a rotation angle relative to the original picture, e.g., an angle of rightward rotation relative to the original picture, or an angle of leftward rotation relative to the original picture. In some embodiments, the predetermined condition refers to that the current angle of the preview picture determined matches with the display screen so that the preview picture and/or the original picture can be viewed conveniently. It shall be noted that if the preview display parameter is a rotation angle, then the preview picture is a rotation preview picture.

In some embodiments, the preview display parameter is a picture brightness, a picture definition, a rotation angle, and/or a contrast. The original picture is reduced in size into a preview picture, and further the parameter including the brightness, the definition, the rotation angle, and/or the contrast of the picture is adjusted to obtain a number of preview pictures. The predetermined condition refers to that the picture brightness, the picture definition, and/or the contrast matches with the current ambient illumination condition, so that a user can view comfortably the preview picture with the preview display parameter satisfying the predetermined condition under the current ambient illumination condition.

In some embodiments, before the original picture is obtained, the terminal can further firstly determine that attribute information carried in the original picture does not include a preview display parameter of the original picture being last displayed.

Figure 3:
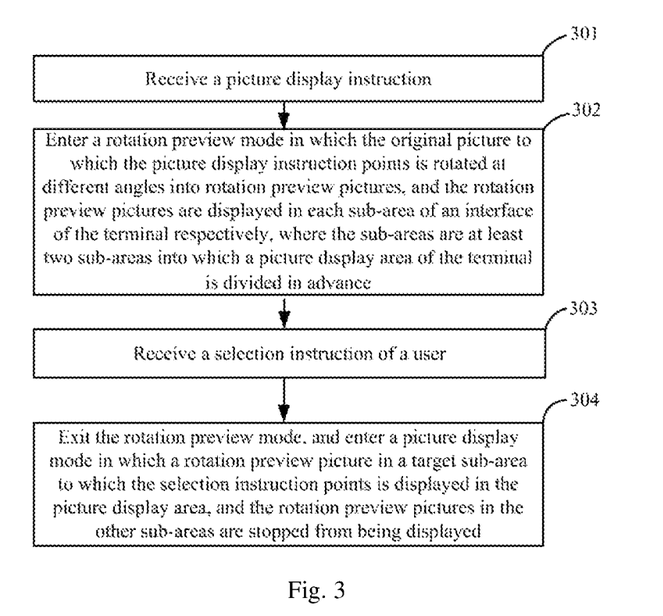
FIG. 3 is a flow chart of a method for displaying a picture on a terminal according to some embodiments of the disclosure.

Referring to FIG. 3 illustrating a flow chart of a method for displaying a picture on a terminal according to some embodiments of the disclosure, the method can include the following operations:

The operation 301 is to receive a picture display instruction.

The picture display instruction can carry a memory address of the picture. The picture display instruction can be triggered in a number of ways, for example, if a picture folder is entered, and the corresponding picture to be displayed is selected, then the picture display instruction will be triggered; or if a control on a display interface of the terminal is set to the memory address pointing to the picture, and clicked on, then the picture display instruction will be triggered.

The operation 302 is to enter a rotation preview mode in which the original picture to which the picture display instruction points is rotated at different angles into rotation preview pictures, and the rotation preview pictures are displayed in each sub-area of an interface of the terminal respectively, where the sub-areas are at least two sub-areas into which a picture display area of the terminal is divided in advance.

The terminal is provided with a rotation preview mode control switch configured to control whether to enable the rotation preview mode, and if the rotation preview mode control switch is closed, then the original picture will be displayed directly upon reception of the picture display instruction as in the prior art. If there are a large number of pictures to be rotated in a set of pictures browsed by a user, then the rotation preview mode control switch can be opened.

The corresponding original picture is located at the memory address carried in the display instruction, and at this time, the original picture may be displayed in the correct direction, or may need to be rotated at some angle. In an embodiment of the disclosure, the original picture in whichever direction is rotated at different angles and then displayed respectively in the sub-areas.

Figure 4:
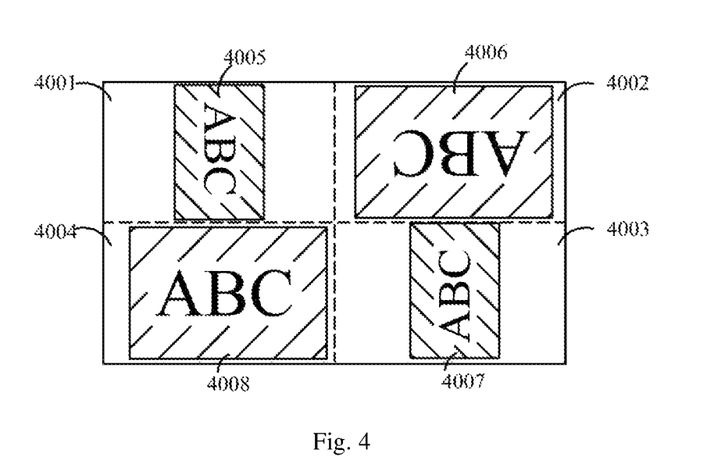
FIG. 4 is a schematic diagram of a rotation browse mode according to some embodiments of the disclosure.

In some embodiments, the picture display area of the terminal is divided into four sub-areas so that the respective sub-areas do not overlap with each other, or at least partially overlap with each other. The original picture is rotated respectively at 0° (i.e., not rotated), 90°, 180°, and 270° into four rotation preview pictures, which are displayed respectively in the four sub-areas; and as illustrated in FIG. 4, sub-areas 4001, 4002, 4003, and 4004 are the four sub-areas respectively into which the picture display area is divided, and rotation preview pictures 4005, 4006, 4007, and 4008 are the rotation preview pictures respectively into which the original picture is rotated respectively at 0°, 90°, 180°, and 270°.

Since the original picture is variable in size, the rotation preview pictures into which the original picture is transformed may exceed display ranges of the sub-areas, so in some embodiments, the operation 302 can further include the following sub-operations:

302*a* is to rotate at the different angles the original picture to which the picture display instruction points, into the rotation preview pictures;

302*b* is to determine whether the sizes of the rotation preview pictures exceed display ranges of the corresponding sub-areas; and

302*c* is to reduce the rotation preview pictures so that they are completely displayed in the corresponding sub-areas, if the sizes of the rotation preview pictures exceed the display ranges of the corresponding sub-areas.

The original picture includes attribute information in which size information of the picture is recorded.

The operation 303 is to receive a selection instruction of a user.

If the terminal is a TV set, then the selection instruction will be triggered by pressing a key on a remote controller. In order to simplify an operation, a corresponding shortcut key can be arranged for each sub-area, for example, a numeral key "1" represents a sub-area on the top left, a numeral key "2" represents a sub-area on the top right, a numeral key "3" represents a sub-area on the bottom left, and a numeral key "4" represents a sub-area on the bottom right. If the rotation preview picture in the sub-area on the bottom left is displayed in the correct direction, then the user pressing down the numeral key "3" can select the rotation preview picture. If the terminal is a handset, or another device with a touch screen, then the selection instruction will be triggered by a touch sensor on the display screen, and the user can touch directly in a corresponding sub-area to generate the selection instruction to select the rotation preview picture in the sub-area.

The operation 304 is to exit the rotation preview mode, and to enter a picture display mode in which a rotation preview picture in a target sub-area to which the selection instruction points is displayed in the picture display area, and the rotation preview pictures in the other sub-areas are stopped from being displayed.

Figure 5:
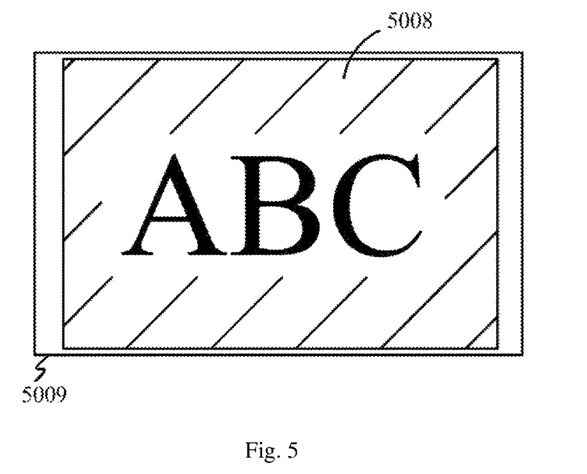
FIG. 5 is a schematic diagram of a picture display mode according to some embodiments of the disclosure.

The picture display mode in some embodiments of the disclosure is equivalent to the picture being displayed normally in the prior art except that the rotation preview picture selected by the user is displayed. Since the rotation preview picture may be displayed in the sub-area after being reduced, the rotation preview picture can be displayed in the picture display mode by restoring the rotation preview picture to the size of the original picture, or displaying the rotation preview picture throughout the picture display area of the terminal. As illustrated in FIG. 5 which is a schematic diagram of the picture display mode, if the user selects the rotation preview picture in the sub-area 4004, then the rotation preview picture 5008 will be displayed in the picture display area 5009.

In some embodiments of the disclosure, the rotation preview pictures into which the original picture is rotated at the different angles can be displayed concurrently in each sub-areas of the interface of the terminal respectively, and if the user selects the rotation preview picture corresponding to the desirable direction, then this rotation preview picture selected will be displayed on the interface of the terminal.

Figure 6:
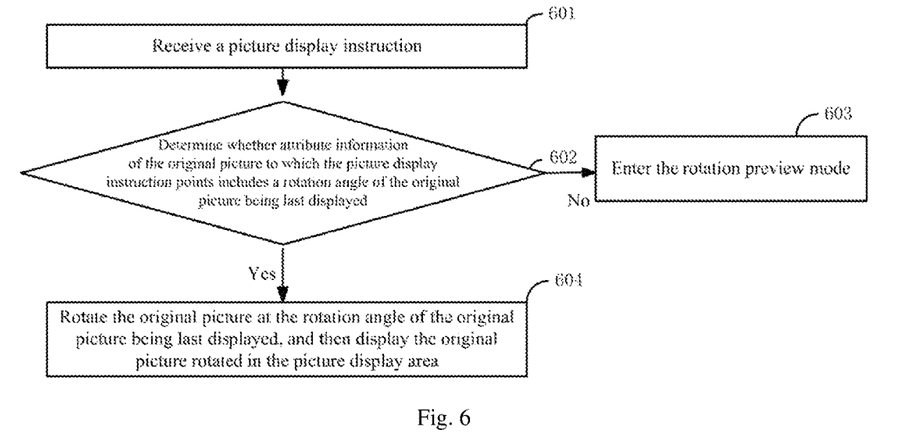
FIG. 6 is a flow chart of a method for displaying a picture on a terminal according to some embodiments of the disclosure.

If the same picture is viewed again, or the same picture is copied into another memory card, the name of the file is changed, and this picture is displayed again, then if the terminal still firstly enters the rotation preview mode, and then enters the picture display mode upon reception of the selection instruction, then the operations will still become troublesome, so in some embodiments of the disclosure, there is further provided a flow chart of a method for displaying a picture on a terminal as illustrated in FIG. 6.

The operation 601 is to receive a picture display instruction.

The operation 602 is to determine whether attribute information of the original picture to which the picture display instruction points includes a rotation angle of the original picture being last displayed, and if the attribute information of the original picture does not include the rotation angle of the original picture being last displayed, to proceed to the operation 603; or if the attribute information of the original picture includes the rotation angle of the original picture being last displayed, to proceed to the operation 604.

Here the original picture includes the attribute information in which the rotation angle of the original picture being last displayed is recorded.

The operation 603 is to enter the rotation preview mode.

The operation 604 is to rotate the original picture at the rotation angle of the original picture being last displayed, and then display the original picture rotated in the picture display area.

If the original picture is displayed for the first time, then information in the attribute information about the rotation angle of the original picture being last displayed will be null, and the terminal can enter the rotation preview mode, that is, proceed to the operation 302 and the operations subsequent thereto. After the operation 303 or the operation 304 is performed, the rotation angle of the original picture will be recorded in the attribute information. Thus if the original picture is displayed again, then firstly the attribute information will be checked, where the attribute information includes the rotation angle of the original picture being last displayed, which indicates that the original picture is not displayed for the first time, so the original picture will be rotated directly at the rotation angle, and displayed in the picture display area.

Of course, if the rotation angle of the original picture being displayed for the N-th time (not for the first time) is changed, then the new rotation angle will be recorded in the attribute information instead of the original rotation angle.

In some embodiments of the disclosure, display effects of the pictures being rotated in the different directions can be presented concurrently, so that if the user selects one of the pictures, then the rotation angle selected can be stored, and will not be reselected next time the picture is displayed, thus greatly improving the usability of the terminal.

The respective method embodiments above have been described as a series of actions in combination for the sake of a convenient description, but those skilled in the art shall appreciate that appreciate that the disclosure will not be limited to the order of the actions as described above, so some of the operations can be performed in another order or concurrently without departing from the scope of the disclosure. Secondly those skilled in the art shall also appreciate that all the embodiments described in this specification are preferred embodiments, and the actions and the modules as referred to may not be necessary to the disclosure.

Figure 7:
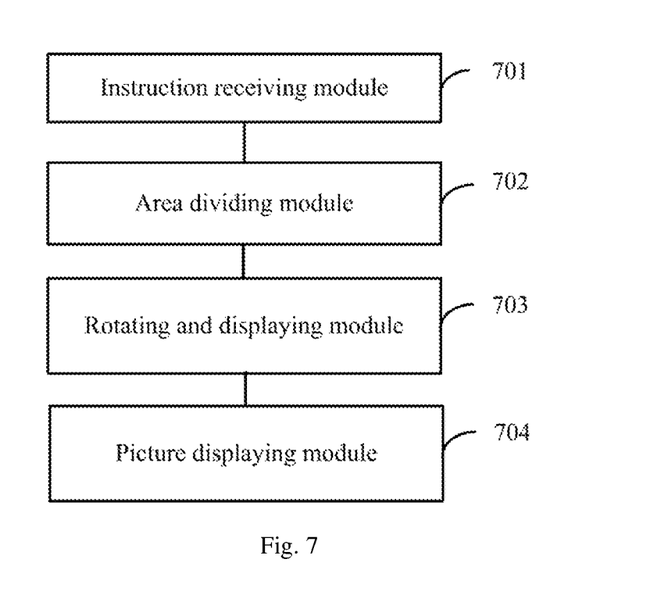
FIG. 7 is a structural block diagram of a terminal according to some embodiments of the disclosure.

Referring to FIG. 7 which is a structural block diagram of a terminal for displaying a picture according to some embodiments of the disclosure, the terminal includes:

An instruction receiving module 701 is configured to receive a picture display instruction.

An area dividing module 702 is configured to divide in advance a picture display area of the terminal into at least two sub-areas.

A rotating and displaying module 703 is configured to enter a rotation preview mode in which the original picture to which the picture display instruction points is rotated at different angles into rotation preview pictures, and the rotation preview pictures are displayed in each sub-area of an interface of the terminal respectively.

The instruction receiving module 701 is further configured to receive a selection instruction of a user.

A picture displaying module 704 is configured to exit the rotation preview mode, and to enter a picture display mode in which a rotation preview picture in a target sub-area to which the selection instruction points is displayed in the picture display area, and the rotation preview pictures in the other sub-areas are stopped from being displayed.

The number of sub-areas can be four. The rotating and displaying module is further configured to rotate the original picture to which the picture display instruction points, respectively at 0°, 90°, 180°, and 270° into four rotation preview pictures, and to display them respectively in the four sub-areas.

An instruction receiving device is configured to receive the selection instruction triggered by pressing a key on a remote controller, or by a touch sensor on a display screen.

Figure 8:
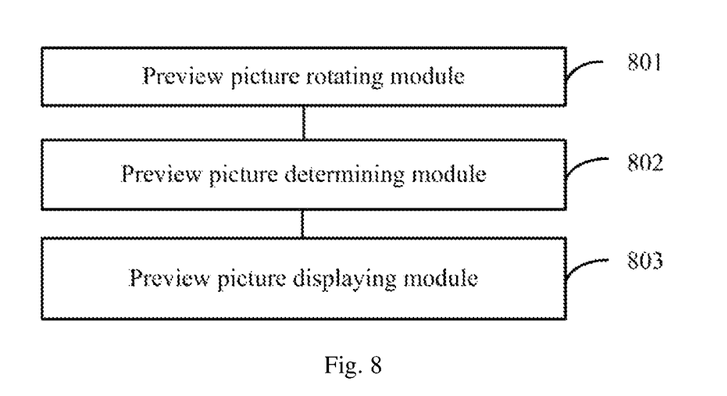
FIG. 8 is a structural block diagram of a rotating and browsing module according to some embodiments of the disclosure.

As illustrated in FIG. 8, the rotating and displaying module 703 includes:

A preview picture rotating module 801 is configured to rotate at the different angles the original picture to which the picture display instruction points, into the rotation preview pictures;

A preview picture determining module 802 is configured to determine whether the sizes of the rotation preview pictures exceed display ranges of the corresponding sub-areas; and A preview picture displaying module 803 is configured to reduce the rotation preview pictures so that they are completely displayed in the corresponding sub-areas, if the sizes of the rotation preview pictures exceed the display ranges of the corresponding sub-areas.

The original picture includes attribute information in which size information of the picture being last displayed is recorded.

The terminal further includes:

A determining module is configured to determine whether attribute information of the original picture includes a rotation angle of the original picture being last displayed, upon reception of a picture display instruction.

The rotating and displaying module is configured to enter the rotation preview mode if the attribute information of the original picture does not include the rotation angle of the original picture being last displayed.

The image displaying module is configured to rotate the original picture at the rotation angle of the original picture being last displayed, and then display the original picture rotated in the picture display area, if the attribute information of the original picture includes the rotation angle of the original picture being last displayed.

With the terminal according to some embodiments of the disclosure, the rotation preview pictures into which the original picture is rotated at the different angles can be displayed concurrently in sub-areas of the interface of the terminal respectively, and if the user selects the rotation preview picture corresponding to the desirable direction, then this picture will be displayed on the interface of the terminal.

Moreover the rotation angle of the picture being displayed for the first time can be recorded, and will not be reselected next time the picture is displayed, thus greatly improving the usability of the terminal.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A terminal, comprising:
a display screen having a display area including at least two preset sub-areas;
a memory including instructions stored therein; and
one or more processors configured to execute the instructions to:
obtain multiple preview pictures of a complete original picture by rotating the original picture at different rotation angles;
determine whether sizes of the preview pictures exceed sizes of corresponding sub-areas configured to display the preview pictures;
reduce the size of one of the preview pictures to match the size of its corresponding sub-area in response to determining that the size of the preview picture exceeds the size of its corresponding sub-area;
display the preview pictures in the corresponding sub-areas, wherein each of the preview pictures is completely displayed in a different one of the sub-areas;
determine one of the preview pictures having a rotation angle that satisfies a predetermined condition; and
adjust the size of the determined preview picture to match a size of the display area, to display the determined preview picture in the display area.

2. The terminal according to claim 1, wherein the terminal further comprises a control module configured to determine the preview picture having the rotation angle that satisfies the predetermined condition, or wherein the terminal is connected to an external control device configured to determine the preview picture having the rotation angle that satisfies the predetermined condition.

3. The terminal according to claim 1, wherein the predetermined condition includes the rotation angle matching a viewing direction of the display screen.

4. The terminal according to claim 1, wherein the one or more processors are further configured to execute the instructions to:
in response to determining that the attribute information includes a rotation angle used during a most recent display of the original picture, display the original picture in the display area by rotating the original picture at the rotation angle used during the most recent display of the original picture.

5. The terminal according to claim 1, wherein the one or more processors are further configured to execute the instructions to:
before the preview pictures of the complete original picture are obtained, determine whether attribute information included in the original picture includes a rotation angle used during a most recent display of the original picture; and
in response to determining that the attribute information does not include the rotation angle, obtain the preview pictures of the complete original picture by rotating the original picture at different rotation angles.

6. A method for displaying a picture on a terminal including a display screen having a display area that includes at least two preset sub-areas, the method comprising:
obtaining multiple preview pictures of a complete original picture by rotating the original picture at different rotation angles;
determining whether sizes of the preview pictures exceed sizes of corresponding sub-areas configured to display the preview pictures;
reducing the size of one of the preview pictures to match the size of its corresponding sub-area in response to determining that the size of the preview picture exceeds the size of its corresponding sub-area;
displaying the preview pictures in the corresponding sub-areas, wherein each of the preview pictures is completely displayed in a different sub-area;
determining one of the preview pictures having a rotation angle that satisfies a predetermined condition; and
adjusting the size of the determined preview picture to match a size of the display area, to display the determined preview picture in the display area.

7. The method according to claim 6, wherein the terminal includes a control module configured to determine the preview picture having the rotation angle that satisfies the predetermined condition, or the terminal is connected to an external control device configured to determine the preview picture having the rotation angle that satisfies the predetermined condition.

8. The method according to claim 6, wherein the predetermined condition includes the rotation angle matching a viewing direction of the display screen.

9. The method according to claim 6, wherein before obtaining the multiple preview pictures of the complete original picture, the method further comprises:
- determining whether attribute information included in the original picture includes a rotation angle used during a most recent display of the original picture; and
- wherein obtaining the multiple preview pictures of the complete original picture by rotating the original picture at different rotation angles comprises:
- in response to determining that the attribute information does not include the rotation angle used during the most recent display of the original picture, obtaining the multiple preview pictures of the complete original picture by rotating the original picture at different rotation angles.

10. The method according to claim 9, further comprising:
- in response to determining that the attribute information includes the rotation angle used during the most recently display of the original picture, displaying the original picture in the display area by rotating the original picture at the rotation angle.

* * * * *